(12) United States Patent
Read (10) Patent No.: US 7,436,793 B2
(45) Date of Patent: Oct. 14, 2008

(54) SYSTEM AND METHOD FOR EFFECTIVELY PERFORMING A TRANSMIT POWER ADJUSTMENT PROCEDURE

(75) Inventor: Christopher J. Read, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 739 days.

(21) Appl. No.: 10/937,171

(22) Filed: Sep. 9, 2004

(65) Prior Publication Data
US 2006/0050732 A1 Mar. 9, 2006

(51) Int. Cl.
*H04B 7/185* (2006.01)
(52) U.S. Cl. .................. 370/318; 370/310; 370/320; 370/322; 370/335; 370/342; 370/441; 370/252; 370/329; 370/332; 370/333; 455/134; 455/135; 455/136; 455/138
(58) Field of Classification Search .................. None
See application file for complete search history.

(56) References Cited

U.S. PATENT DOCUMENTS 5,361,091 A * 11/1994 Hoarty et al. ............... 725/119
6,151,328 A * 11/2000 Kwon et al. ................ 370/441
6,374,085 B1 * 4/2002 Saints et al. ................ 455/69
6,674,966 B1    1/2004 Koonen ....................... 398/70
2005/0264647 A1* 12/2005 Rzeszewski et al. ...... 348/14.02

* cited by examiner

*Primary Examiner*—Raj K Jain
(74) *Attorney, Agent, or Firm*—Gregory J. Koerner; Redwood Patent Law (57) ABSTRACT

A system and method for effectively performing a transmit power adjustment procedure in a wireless network includes a forward receiver that monitors a wireless forward link for forward data that is transmitted over the wireless forward link by a forward transmitter. The forward transmitter initially transmits the forward data at a minimum power level, and gradually increases the minimum power level to a power level threshold at which the forward receiver first detects the forward data on the forward link. Once the forward receiver and the forward transmitter are successfully coupled over the wireless forward link, the forward transmitter may then transmit forward data at a normal operating power level. The foregoing transmit power adjustment procedure ensures that the forward receiver receives forward data only from the forward transmitter, and prevents other proximate wireless devices from inadvertently intercepting forward data transmitted by the forward receiver.

21 Claims, 11 Drawing Sheets

SYSTEM AND METHOD FOR EFFECTIVELY PERFORMING A TRANSMIT POWER ADJUSTMENT PROCEDURE

BACKGROUND SECTION

1. Field of the Invention

This invention relates generally to techniques for implementing wireless electronic systems, and relates more particularly to a system and method for effectively performing a transmit power adjustment procedure in a wireless network.

2. Description of the Background Art

Developing effective methods for implementing wireless electronic systems is a significant consideration for designers and manufacturers of contemporary electronic technology. However, effectively implementing wireless electronic systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capabilities to perform various advanced operations may provide additional benefits to a system user, but may also place increased demands on the control and management of various system components. For example, an enhanced wireless entertainment system that effectively handles video and audio content may benefit from an efficient implementation because of the large amount and complexity of the digital data involved.

Designing wireless electronic devices that provide various types of enhanced device functionality while still maintaining a sufficient level of user-friendliness and ease-of-operation is another significant consideration when implementing electronic devices for use in certain environments in which the relative level of technical sophistication of device users is not particularly high. In addition, various types of streamlined and automated functionalities may frequently be beneficial in order to allow device users to advantageously utilize their time and energy for performing other productive tasks. For example, wireless electronic systems that automatically address potential wireless communication problems such as signal interference from other wireless systems may prove beneficial to many system users.

Due to growing demands on system resources, potential problems with regard to operating technologically sophisticated systems, and the prevalence of substantially increasing data magnitudes, it is apparent that developing new techniques for effectively implementing wireless electronic systems is a matter of concern for related electronic technologies. Therefore, for all the foregoing reasons, developing effective techniques for implementing wireless electronic systems remains a significant consideration for designers, manufacturers, and users of contemporary wireless electronic systems.

SUMMARY

In accordance with the present invention, a system and method are disclosed for effectively performing a transmit power adjustment procedure in a wireless network. In accordance with one embodiment of the present invention, an electronic system includes, but is not limited to, a data source, a source communications manager, a destination communications manager, and a data destination. The data source provides forward data to the source communications manager that includes, but is not limited to, a forward transmitter.

The forward transmitter transmits the forward data to the destination control manager in a wireless manner via a forward link by utilizing any effective transmission techniques. For example, in certain embodiments, the forward link is implemented as a directional beam-like transmission that operates in the range of approximately 60 gigahertz. The destination control manager includes, but is not limited to, a forward receiver that receives the forward data over the forward link, and then provides the forward data to the data destination.

In accordance with the present invention, the forward transmitter may advantageously perform a transmit power adjustment procedure with regard to the transmit power level of the forward transmitter to thereby reduce the likelihood that forward data transmitted over the forward link is intercepted by any inappropriate proximate wireless devices. During the transmit power adjustment procedure, the forward transmitter initially begins transmitting forward data over the forward link at a pre-determined minimum power level.

The transmit power adjustment procedure assumes that the correct matching forward receiver for the forward data transmitted by the forward transmitter is likely to be the most proximate wireless device with respect to the forward transmitter, and therefore is most likely to detect the transmitted forward data at low power levels. During the transmit power adjustment procedure, the forward transmitter may periodically increase the transmit power level of the forward data by a pre-defined amount until the forward receiver is first able to detect the transmitted forward data.

A confirmation signal may then be returned by the destination communications manager to the source communications manager to complete the transmit power adjustment procedure. Once the source communications manager is correctly coupled to the matching destination communications manager, then the forward transmitter may begin transmitting forward data over the forward link at a normal operating power level. For at least the foregoing reasons, the present invention therefore provides an improved system and method for effectively performing a transmit power adjustment procedure in a wireless network.

DETAILED DESCRIPTION

The present invention relates to an improvement in wireless electronic communication techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for performing a transmit power adjustment procedure in a wireless network, and includes a forward receiver that monitors a wireless forward link for forward data that is transmitted over the wireless forward link by a forward transmitter. The forward transmitter initially transmits the forward data at a minimum power level, and gradually increases the minimum power level to a power level threshold at which the forward receiver first detects the forward data on the forward link.

Once the forward receiver and the forward transmitter are successfully coupled over the wireless forward link, the forward transmitter may then transmit forward data at a normal operating power level. The foregoing transmit power adjustment procedure ensures that the forward receiver receives forward data only from the forward transmitter, and prevents other proximate wireless devices from inadvertently intercepting forward data transmitted by the forward receiver before the intended forward receiver can detect the forward data and reply.

Figure 1:
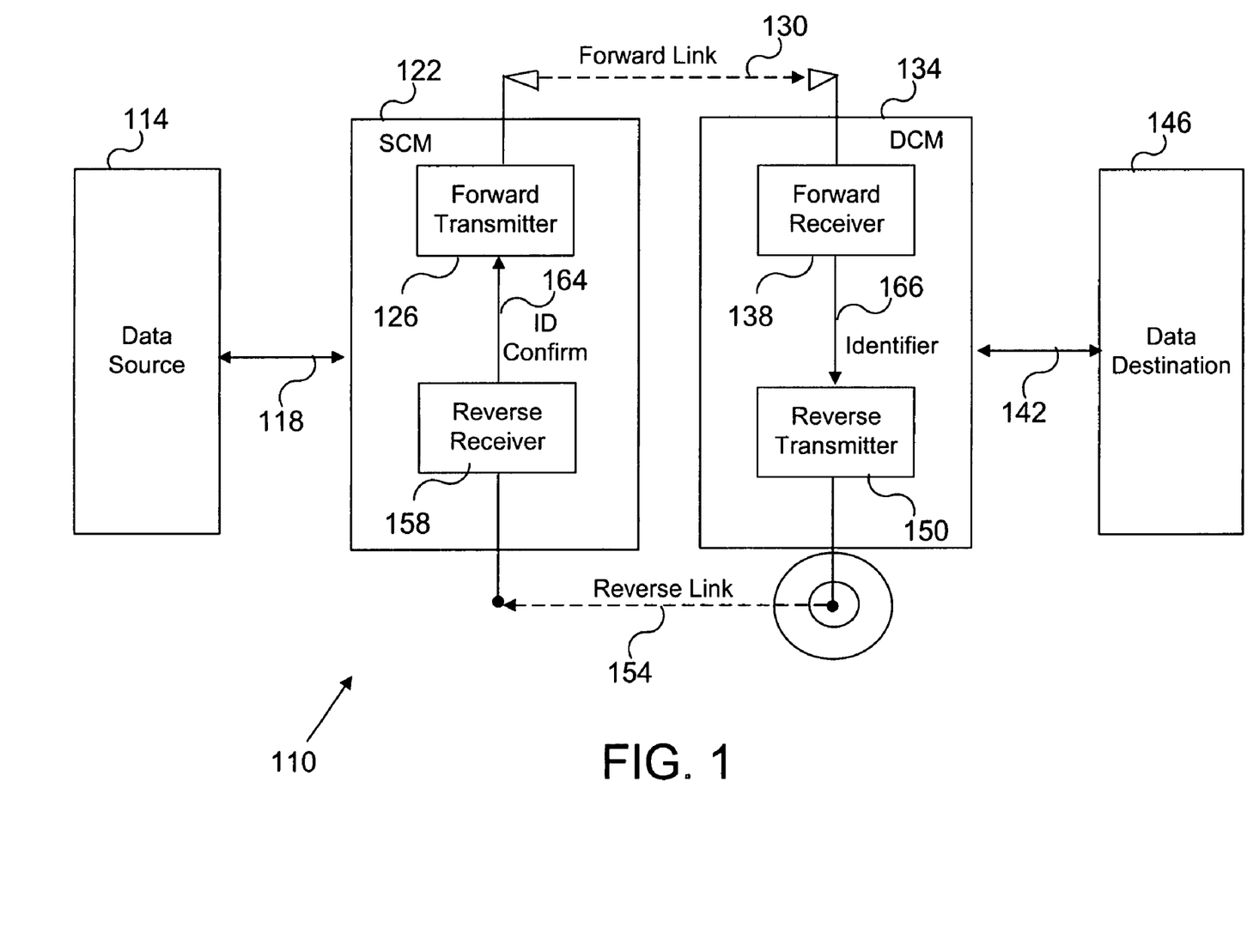
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 includes, but is not limited to, a data source 114, a source communications manager (SCM) 122, a destination communications manager (DCM) 134, and a data destination 146. In alternate embodiments, electronic system 110 may readily be implemented using components and configurations in addition to, or instead of, certain of those components and configurations discussed in conjunction with the FIG. 1 embodiment.

In the FIG. 1 embodiment, data source 114 may be implemented in any effective manner to provide any desired type of data or information to data destination 146. In certain embodiments, data source 114 is implemented as a video data source that provides high-definition video programming to data destination 146 which is implemented as a video programming display device. In the FIG. 1 embodiment, data source 114 provides forward data to source communications manager (SCM) 122 via path 118. In the FIG. 1 embodiment, SCM 122 includes, but is not limited to, a forward transmitter 126 and a reverse receiver 158.

In the FIG. 1 embodiment, forward transmitter 126 transmits the forward data to destination control manager (DCM) 134 in a wireless manner via a forward link 130 by utilizing any effective transmission techniques. For example, in certain embodiments, forward link 130 may be implemented as a highly directional beam-like transmission that operates in the range of approximately 60 gigahertz. In the FIG. 1 embodiment, DCM 134 includes, but is not limited to, a forward receiver 138 and a reverse transmitter 150. In the FIG. 1 embodiment, forward receiver 138 receives the forward data over forward link 130, and then provides the forward data to data destination 146 via path 142. In certain embodiments, forward transmitter 126 includes a forward transmit antenna that is focusable to provide forward data over forward link 130 to a forward receive antenna of forward receiver 138.

In the FIG. 1 embodiment, data destination 146 or DCM 134 may need to transmit various types of reverse data back to SCM 122 or data source 114. Such reverse data may include any desired type of information or data. For example, the reverse data may include various types of control information or status information. The reverse data may include status information regarding the current state of data destination 146, or control information for data source 114 that is initially provided by a system user to data destination 146 with a remote control unit or other means. The reverse data may also include internal control information from DCM 134, such as a request for instructing SCM 122 to increase the transmit power level of forward transmitter 126.

In the FIG. 1 embodiment, reverse transmitter 150 wirelessly transmits the reverse data to SCM 122 via a reverse link 154 that may be implemented in any effective manner. In certain embodiments, reverse link 154 may be implemented as an omni-directional transmission that operates on a selectable reverse channel chosen from among eighty-three different reverse channels in the range of approximately 2.4 gigahertz. Once reverse transmitter 150 selects a reverse channel for reverse link 154, then reverse receiver 158 of SCM 122 performs a channel search procedure to identify and lock onto the particular reverse channel used by reverse transmitter 150 for reverse link 154. Reverse receiver 158 may then receive and provide the transmitted reverse data to SCM 122, or may provide the reverse data to data source 114 via path 118.

In certain operating environments, multiple different instances of electronic system 110 (or other wireless devices) may be located in relatively close proximity to each other. For example, a home environment may have one instance of electronic system 110 in the living room, and may have another instance of electronic system 110 in the family room. In such a situation, because the reverse transmitter 150 of each electronic system 110 is omni-directional, a potential for reverse link interference exists in which a given reverse receiver 158 selects an incorrect reverse channel and receives reverse data from the wrong reverse transmitter 150.

In certain conventional systems, matching identifier codes may be embedded in SCM 122 and DCM 134 to identify matched pairs of reverse transmitters and receivers. However, this inflexible approach only supports matched sets of SCMs 122 and DCMs 134, and fails to allow dynamically selecting reverse channels for any corresponding pair of SCM 122 and DCM 134. In accordance with the present invention, a flexible reverse channel selection procedure may be dynamically and automatically performed by electronic system 110 to correctly couple a reverse receiver 158 to a matching reverse transmitter 150 from the same electronic system 110.

In the FIG. 1 embodiment, forward transmitter 126 initially generates an original identifier by utilizing any effective techniques, and provides the original identifier to reverse receiver 158. Forward transmitter 126 also embeds the original identifier into the forward data transmitted over forward link 130. Forward receiver 138 then combs the original identifier from the transmitted forward data, and provides the original identifier to reverse transmitter 150 via path 166.

In the FIG. 1 embodiment, reverse transmitter 150 embeds the original identifier into the reverse data without change as a returned identifier, and transmits the reverse data over reverse link 154. Reverse receiver 158 of SCM 122 responsively searches through the available reverse channels until the returned identifier is detected in the transmitted reverse data. Reverse receiver 158 matches the returned identifier with the previously-received original identifier to verify that the reverse data on reverse link 154 is from the correct reverse transmitter 150 to thereby complete the reverse channel selection procedure.

As mentioned above, in certain operating environments, multiple different instances of electronic system 110 (or other wireless devices) may be located in relatively close proximity to each other. However, a successful completion of the foregoing reverse channel selection procedure assumes that forward data transmitted over forward link 130 will be received only by the correct forward receiver 138 from electronic system 110. If a different wireless device receives the forward data, then that different wireless device may return the identifier and become incorrectly coupled to source communications manager 122.

In accordance with the present invention, electronic system 110 may therefore advantageously perform a transmit power adjustment procedure with regard to the transmit power level of forward transmitter 126 to thereby reduce the likelihood that forward data transmitted over forward link 130 is intercepted by any inappropriate wireless devices before it is coupled to the correct SCM 122. During the transmit power adjustment procedure, forward transmitter 126 initially begins transmitting forward data at a minimum power level.

The transmit power adjustment procedure assumes that the correct forward receiver 138 is likely to be the most proximate wireless device to forward transmitter 126, and therefore is most likely to detect the transmitted forward data at low power levels. Furthermore, the focusable characteristics of the forward transmit antenna of forward transmitter 126 enables system users to increase the likelihood that the correct forward receiver 138 detects transmitted forward data at low power levels.

During the foregoing transmit power adjustment procedure, forward transmitter 126 may periodically increase the transmit power level of forward transmitter 126 by a pre-defined amount until forward receiver 138 is able to detect the forward data, and the identifier is returned to source communications manager 122 to complete the reverse channel selection procedure. Once source communications manager 122 is coupled to the matching destination communications manager 134 over a given reverse channel, then forward transmitter 126 may begin transmitting forward data over forward link 130 at a normal operating power level. The implementation and utilization of the FIG. 1 electronic system 110 is further discussed below in conjunction with FIGS. 2 through 11.

Figure 2:
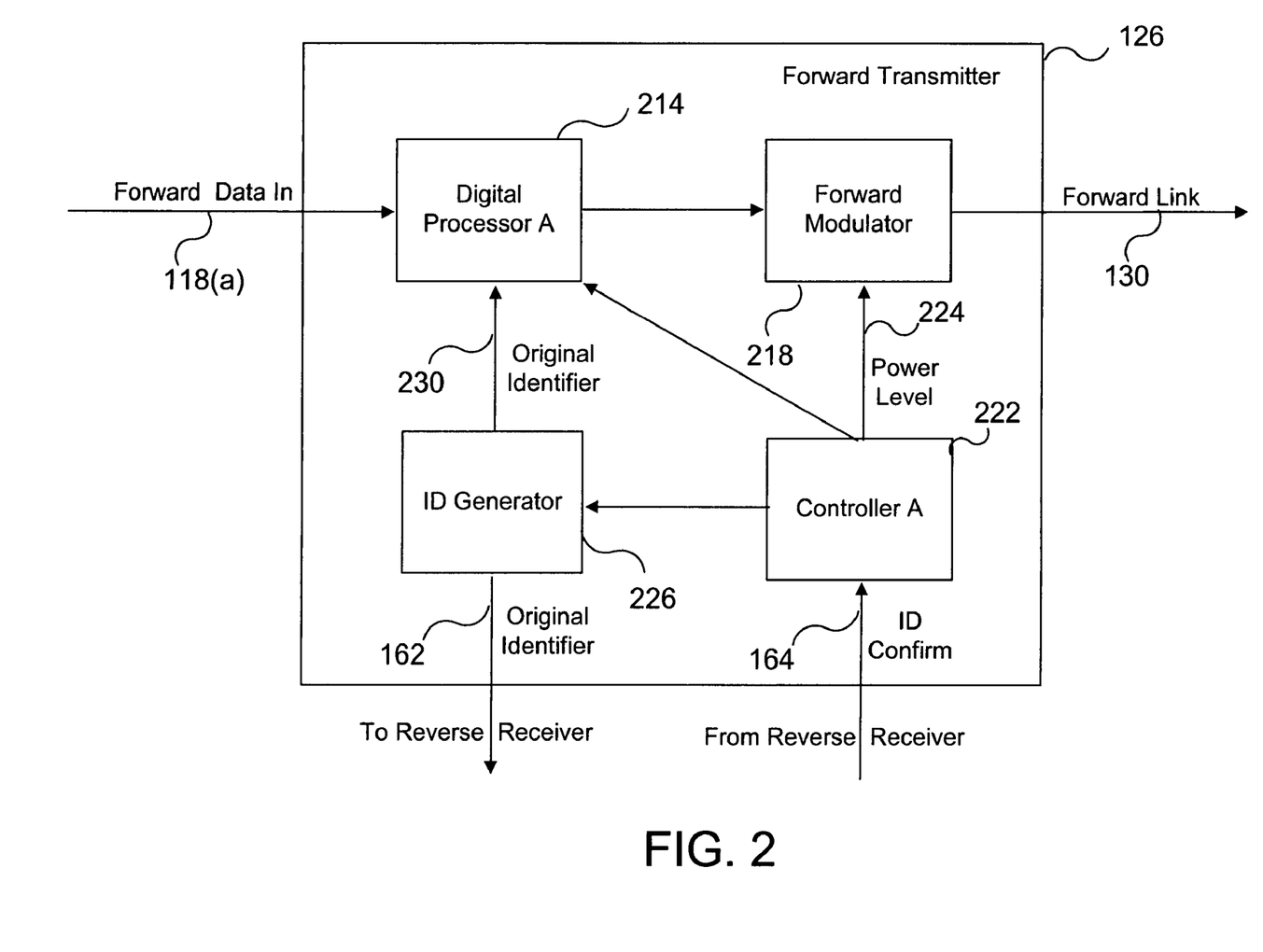
FIG. 2 is a block diagram for one embodiment of the forward transmitter from FIG. 1, in accordance with the present invention.

Referring now to FIG. 2, a block diagram for one embodiment of the FIG. 1 forward transmitter 126 is shown, in accordance with the present invention. In the FIG. 2 embodiment, forward transmitter 126 includes, but is not limited to, a digital processor A 214, a forward modulator 218, a controller A 222, and an ID generator 226. In alternate embodiments, forward transmitter 126 may be implemented using components and configurations in addition to, or instead of, certain of those components and configurations discussed in conjunction with the FIG. 2 embodiment.

In the FIG. 2 embodiment, digital processor A 214 initially receives a Forward Data In signal from data source 114 (FIG. 1) via path 118(a). Digital processor A 214 may then perform any desired type of processing operations upon the Forward Data In to produce processed forward data. For example, digital processor A 214 may perform various error correction, format conversion, or packetizing procedures upon Forward Data In to produce processed forward data. Digital processor A 214 then provides the processed forward data to forward modulator 218 which responsively performs a modulation procedure upon the processed forward data to produce modulated forward data that is transmitted over forward link 130 to a forward receiver 138 of a DCM 134 (FIG. 1).

In the FIG. 2 embodiment, an ID generator 226 generates an original identifier by utilizing any effective techniques. For example, ID generator 226 may include a pseudo-random number generator that generates a random binary number as the original identifier. The original identifier may be implemented in any desired manner. For example, the original identifier may be implemented as a random binary number of 4-bits, 8-bits, or 16-bits. In certain embodiments, the original identifier may be based upon a certain segment of digital information from the Forward Data In received from data source 114.

In the FIG. 2 embodiment, ID generator 226 provides the original identifier to reverse receiver 158 (FIG. 1) via path 162, and also provides the original identifier to digital processor A 214 via path 230. In response, digital processor A 214 embeds the original identifier into the processed forward data so that the original identifier is then transmitted over forward link 130 in the forward data sent to forward receiver 138 (FIG. 1). In the FIG. 2 embodiment, controller A 222 manages the overall operation of forward transmitter 126.

In accordance with the present invention, during a transmit power adjustment procedure, forward transmitter 126 adjusts the transmit power level of forward modulator 218 to reduce the likelihood that forward data transmitted over forward link 130 is intercepted by any inappropriate wireless devices. During the transmit power adjustment procedure, controller A 222 instructs forward modulator 218 to initially begin transmitting forward data with the embedded identifier at a minimum power level. Controller A 222 may then instruct forward modulator 218 to periodically increase the transmit power level by a pre-defined amount until forward receiver 138 of destination communications manager 134 is first able to detect the forward data 138, the embedded identifier is returned to source communications module 122, and controller A 222 receives an ID confirm signal from reverse receiver 158 via path 164. Once source communications manager 122 is coupled to the matching destination communications manager 134 over a given reverse channel, then controller A 222 may instruct forward modulator 218 to begin transmitting forward data over forward link 130 at a normal operating power level. The utilization of forward transmitter 126 is further discussed below in conjunction with FIGS. 6-9.

Figure 3:
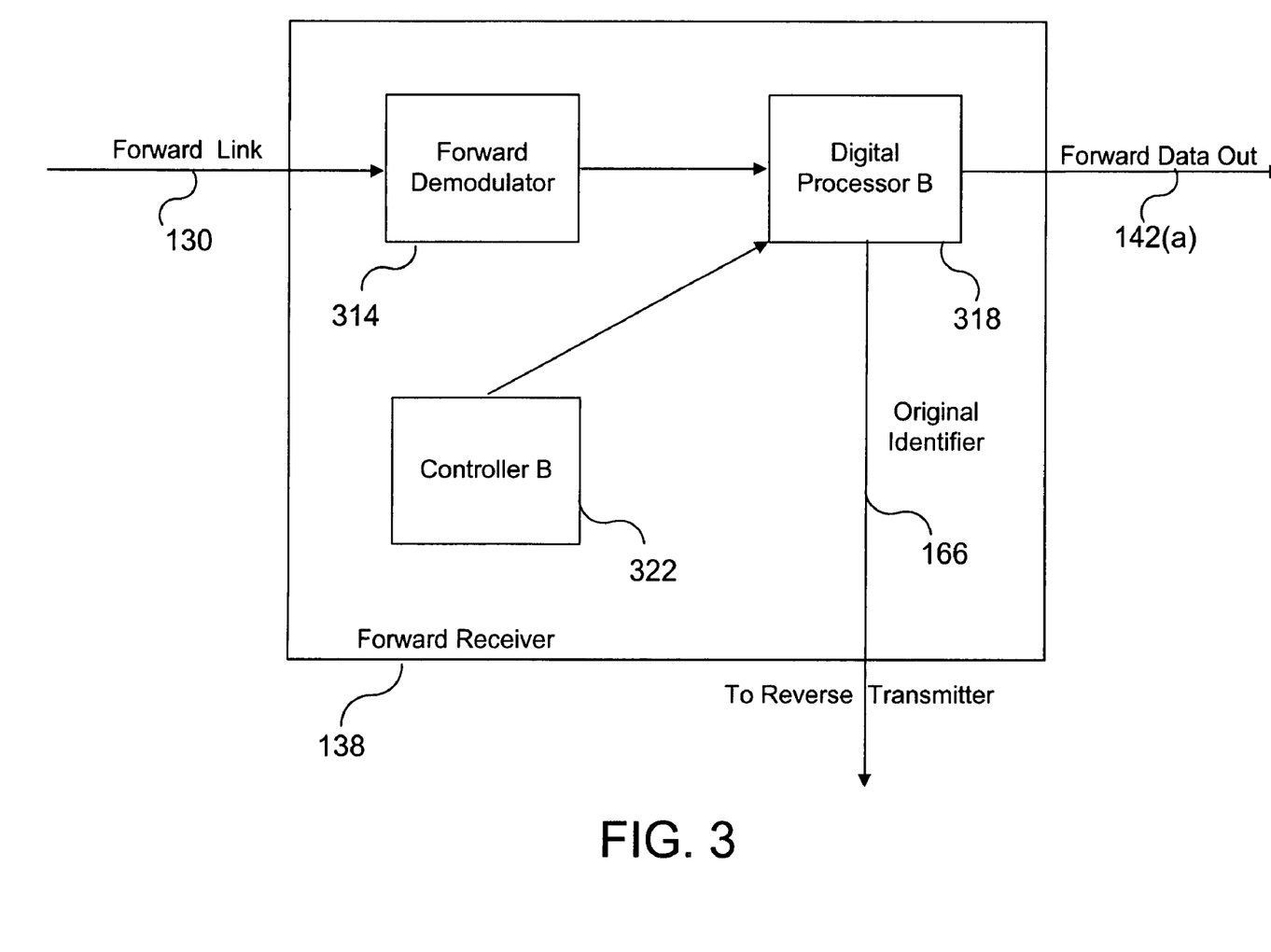
FIG. 3 is a block diagram for one embodiment of the forward receiver from FIG. 1, in accordance with the present invention.

Referring now to FIG. 3, a block diagram for one embodiment of the FIG. 1 forward receiver 138 is shown, in accordance with the present invention. In the FIG. 3 embodiment, forward receiver 138 includes, but is not limited to, a forward demodulator 314, a digital processor B 318, and a controller B 322. In alternate embodiments, forward receiver 138 may be implemented using components and configurations in addition to, or instead of, certain of those components and configurations discussed in conjunction with the FIG. 3 embodiment.

In the FIG. 3 embodiment, forward demodulator 314 initially receives the modulated forward data transmitted over forward link 130 by forward transmitter 126 (FIG. 2). Forward demodulator 314 then performs a demodulation procedure upon the modulated forward data to provide demodulated forward data to digital processor B 318. In the FIG. 3 embodiment, digital processor B 318 may perform any appropriate processing operations upon the demodulated forward data to produce Forward Data Out that is provided to data destination 146 (FIG. 1) via path 142(a). Controller B 322 manages the overall operation of forward receiver 138.

In accordance with the present invention, digital processor B 318 also detects and combs out the original identifier that was embedded in the forward data by forward transmitter 126 (FIG. 2). Digital processor B 318 may then provide the original identifier to reverse transmitter 150 (FIG. 1) via path 166. The utilization of forward receiver 138 is further discussed below in conjunction with FIGS. 6 and 10.

Figure 4:
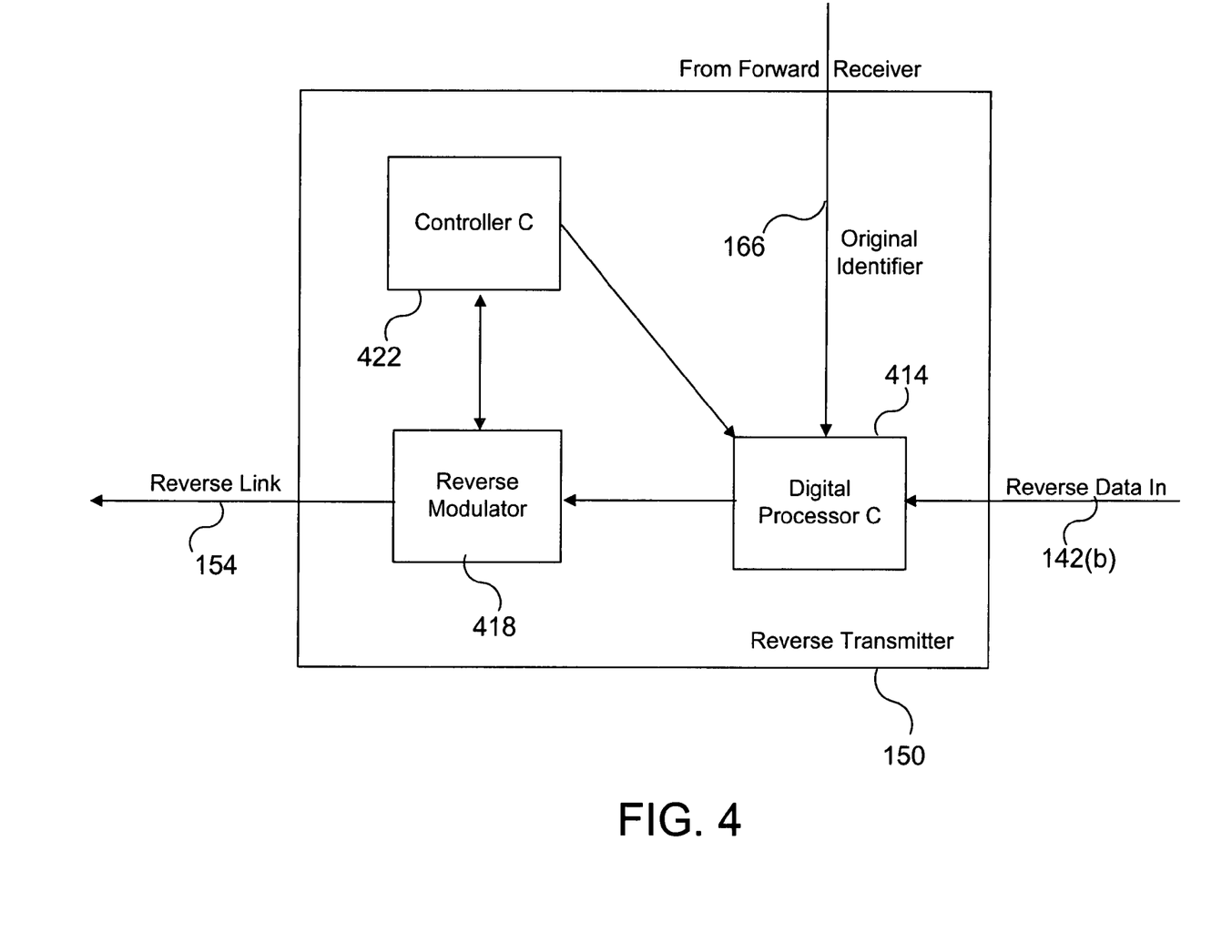
FIG. 4 is a block diagram for one embodiment of the reverse transmitter from FIG. 1, in accordance with the present invention.

Referring now to FIG. 4, a block diagram for one embodiment of the FIG. 1 reverse transmitter 150 is shown, in accordance with the present invention. In the FIG. 4 embodiment, reverse transmitter 150 includes, but is not limited to, a digital processor C 414, a reverse modulator 418, and a controller C 422. In alternate embodiments, reverse transmitter 150 may be implemented using components and configurations in addition to, or instead of, certain of those components and configurations discussed in conjunction with the FIG. 4 embodiment.

In the FIG. 4 embodiment, digital processor C 414 receives Reverse Data In from data destination 146 (FIG. 1) via path 142(b), and responsively performs appropriate processing procedures to produce processed reverse data. Digital processor C 414 then provides the processed reverse data to reverse modulator 418 which performs a modulation procedure upon the processed reverse data to produce modulated reverse data that is transmitted to reverse receiver 158 (FIG. 1) of SCM 122 (FIG. 1) over a selected reverse channel via reverse link 154.

In the FIG. 4 embodiment, controller C 422 may control reverse modulator 418 with regard to selecting an appropriate reverse channel for transmitting reverse data over reverse link 154. In certain embodiments, reverse transmitter 150 may be implemented as a transceiver (transmitter-receiver) device that also utilizes reverse modulator 418 as a demodulator device for listing to reverse channels to determine whether a particular reverse channel is clear of other wireless transmissions, or whether another wireless transmission device is current utilizing that particular reverse channel.

In accordance with the FIG. 4 embodiment, digital processor C 414 receives the original identifier provided by forward receiver 138 (FIG. 1) via path 166, as discussed above in conjunction with FIG. 3. Digital processor C 414 responsively embeds the received original identifier without change into the processed reverse data as a returned identifier. Reverse modulator 418 may then transmit the reverse data with the embedded returned identifier to reverse receiver 158 (FIG. 1) via reverse link 154. The implementation and utilization of the FIG. 4 reverse transmitter 150 is further discussed below in conjunction with FIG. 10.

Figure 5:
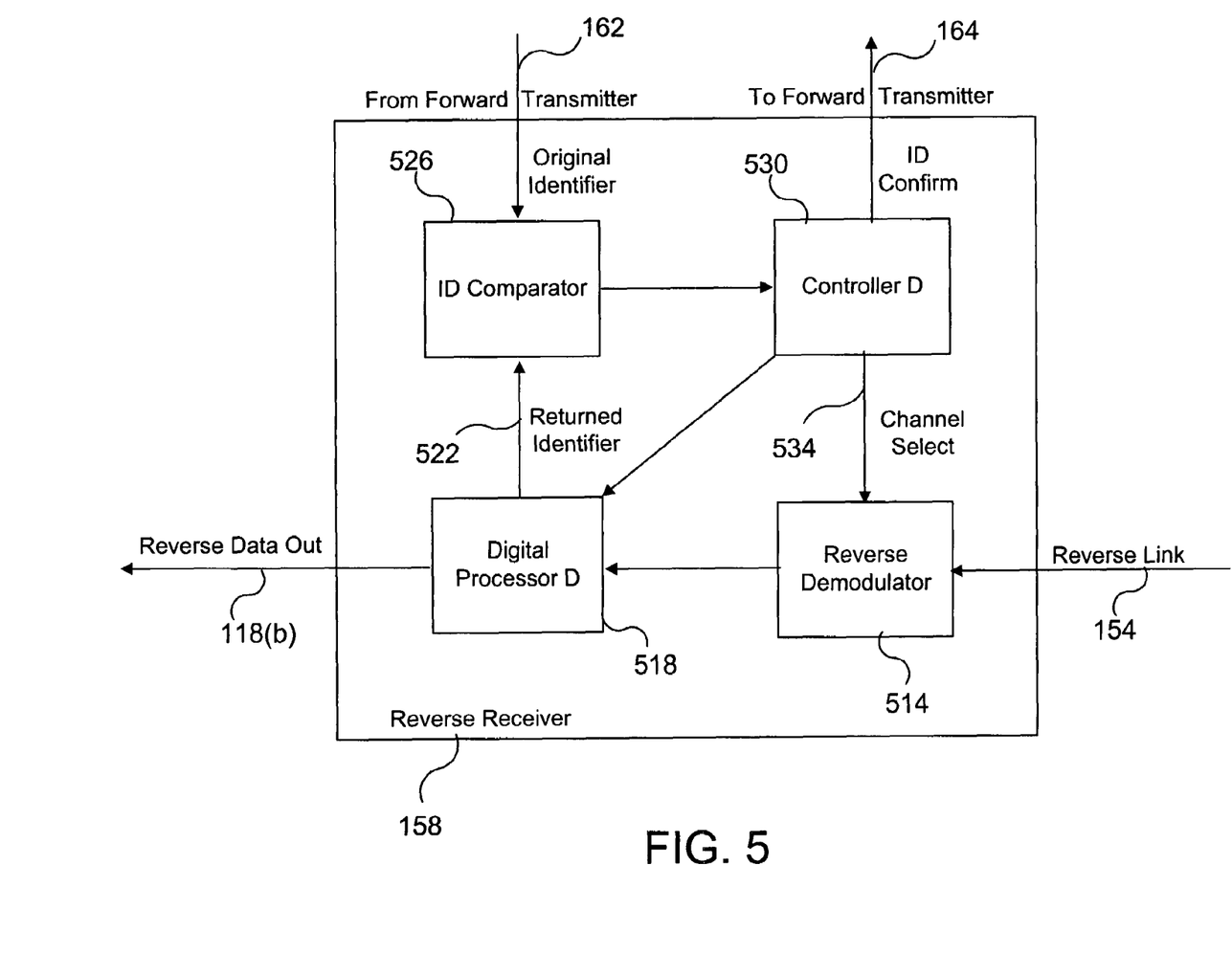
FIG. 5 is a block diagram for one embodiment of the reverse receiver from FIG. 1, in accordance with the present invention.

Referring now to FIG. 5, a block diagram for one embodiment of the FIG. 1 reverse receiver 158 is shown, in accordance with the present invention. In the FIG. 5 embodiment, reverse receiver 158 includes, but is not limited to, a reverse demodulator 514, a digital processor D 518, an ID comparator 526, and a controller D 530. In alternate embodiments, reverse receiver 158 may be implemented using components and configurations in addition to, or instead of, certain of those components and configurations discussed in conjunction with the FIG. 5 embodiment.

In the FIG. 5 embodiment, the forward transmitter 126 of foregoing FIG. 2 initially provides a copy of the original identifier to ID comparator 526 via path 162. Reverse demodulator 514 may then select a given reverse channel for receiving modulated reverse data over reverse link 154. If reverse data is present, reverse demodulator 514 performs a demodulation procedure to generate demodulated reverse data that is provided to digital processor D 518. Digital processor D 518 performs various processing procedures upon the demodulated reverse data to produce Reverse Data Out 118(b).

Digital processor D 518 also examines the Reverse Data Out for any potential returned identifiers, and provides any potential returned identifiers to ID comparator 526 via path 522. In response, ID comparator 526 performs a matching procedure that compares the original identifier from forward transmitter 126 (FIG. 1) and the potential returned identifier from digital processor D 518. If the potential returned identifier matches the original identifier, then reverse receiver 158 is correctly coupled to reverse transmitter 150 on the correct reverse channel of reverse link 154.

In the FIG. 5 embodiment, ID comparator 526 indicates to controller D 530 whether reverse receiver 158 (FIG. 1) is correctly coupled to the appropriate reverse transmitter 150 based upon the foregoing matching procedure. If reverse receiver 158 is not correctly coupled to the appropriate reverse transmitter 150, then controller D 530 instructs reverse demodulator 514 via path 534 to switch to another reverse channel of reverse link 154. Reverse receiver 158 may then continue to evaluate additional reverse channels until ID comparator 526 confirms that the foregoing matching procedure has detected the correct returned identifier in reverse data from reverse link 154. In accordance with the present invention, until reverse receiver 158 is correctly coupled to the appropriate reverse transmitter 150, forward transmitter 126 (FIG. 1) may continue to perform the transmit power adjustment procedure discussed above in conjunction with FIGS. 1 and 2.

However, if reverse receiver 158 becomes correctly coupled to the appropriate reverse transmitter 150 during the reverse channel selection procedure, then controller D 530 instructs digital processor D 518 to transmit the Reverse Data Out to data source 114 (FIG. 1) via path 118(b) to complete the reverse channel selection procedure. In addition, in accordance with the present invention, controller D 530 sends an ID confirm signal via path 164 to forward transmitter 126 to terminate the transmit power adjustment procedure for transmit power levels of forward link 130. The implementation and utilization of the FIG. 5 reverse receiver 158 is further discussed below in conjunction with FIG. 11.

Figure 6:
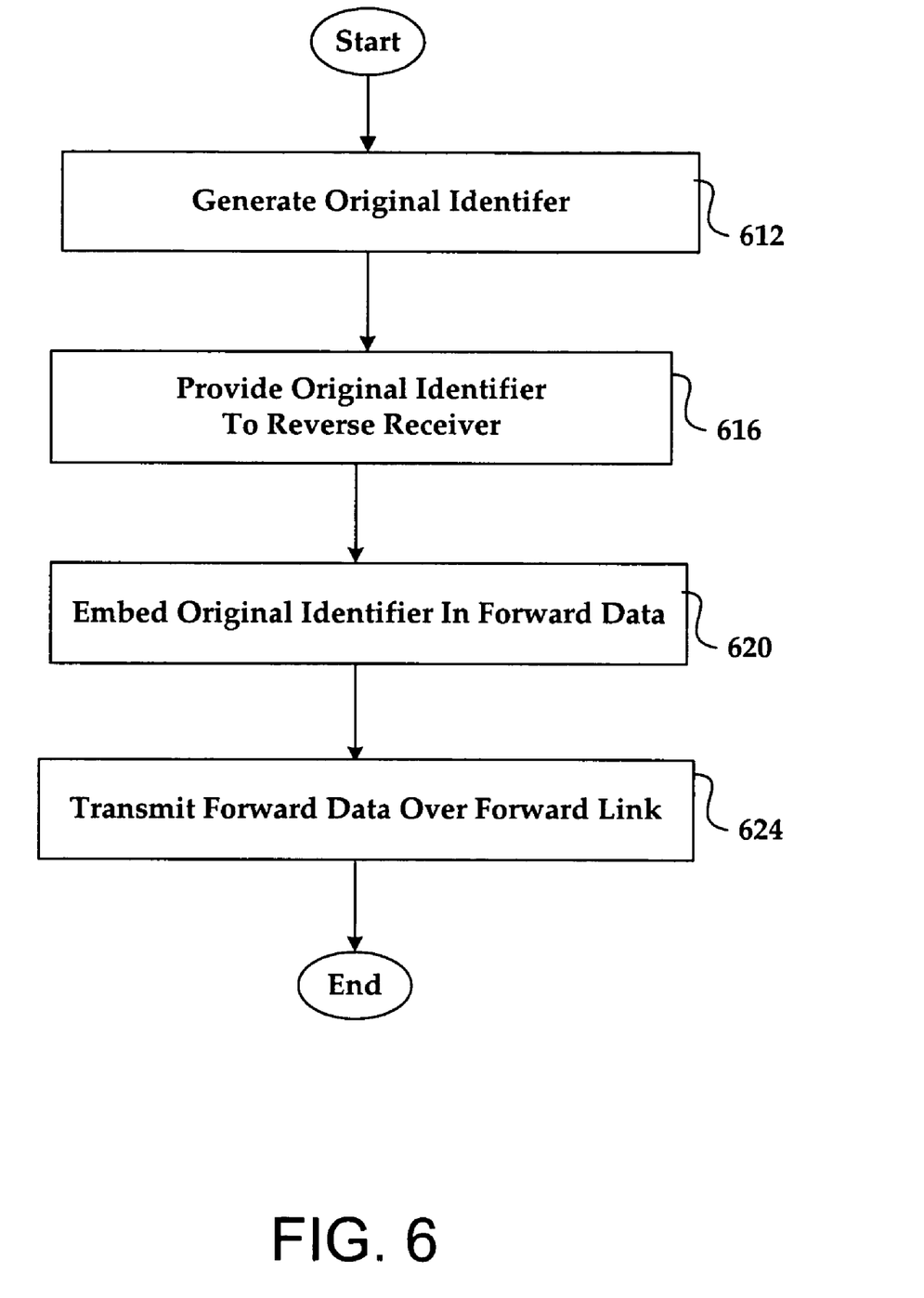
FIG. 6 is a flowchart of method steps for utilizing the forward link of FIG. 1, in accordance with one embodiment of the present invention.

Referring now to FIG. 6, a flowchart of method steps for utilizing the FIG. 1 forward link 130 is shown, in accordance with one embodiment of the present invention. The FIG. 6 example is presented for purposes of illustration, and in alternate embodiments, the present invention may readily utilize steps and sequences other than certain of those discussed in conjunction with the FIG. 6 embodiment.

In the FIG. 6 embodiment, in step 612, a forward transmitter 126 (FIG. 1) initially generates an original identifier by utilizing any effective means. In step 616, forward transmitter 126 provides the original identifier to a reverse receiver 158. Then, in step 620, forward transmitter 126 embeds the original identifier in forward data. In step 624, forward transmitter 126 transmits the forward data with the embedded original identifier over a forward link 130 to a forward receiver 138 (FIG. 1). The FIG. 6 process may then terminate.

Figure 7:
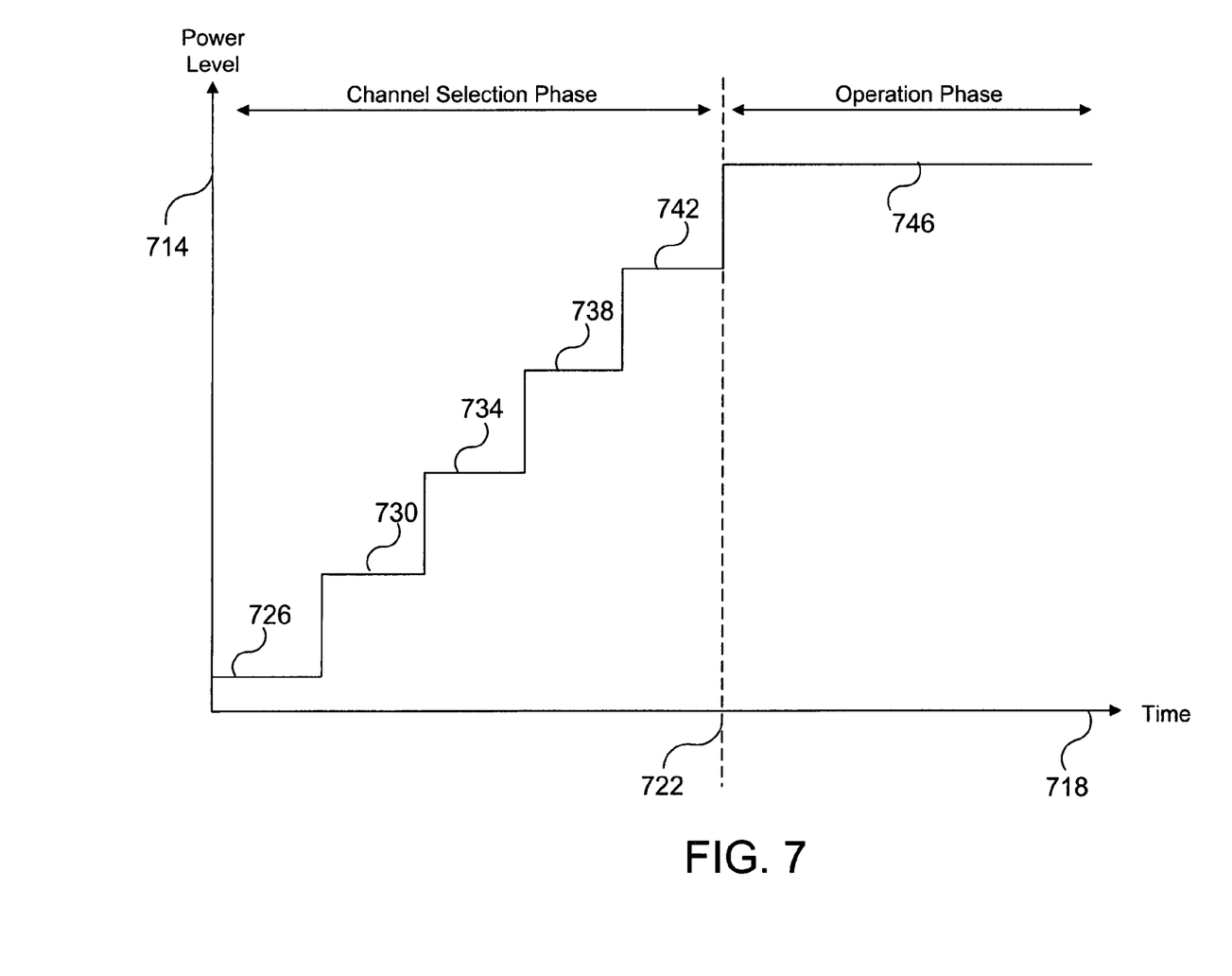
FIG. 7 is a graph illustrating a generalized transmit power adjustment procedure, in accordance with one embodiment of the present invention.

Referring now to FIG. 7, a graph illustrating a generalized transmit power adjustment procedure is shown, in accordance with the present invention. The FIG. 7 embodiment is presented for purposes of illustration only, and in alternate embodiments, various transmit power adjustment procedures may be performed using relationships and techniques in addition to, or instead of, certain of those relationships and techniques discussed in conjunction with the FIG. 7 embodiment.

In the FIG. 7 graph, transmit power levels of forward transmitter 126 (FIG. 1) for transmitting forward data over a forward link 130 are shown on a vertical axis 714. In addition, time is shown progressing from left to right on a horizontal axis 718. In the FIG. 7 example, a channel selection phase occurs prior to time axis 722 during which the transmit power adjustment procedure is concurrently performed. In the FIG. 7 example, after time axis 722, when the channel selection procedure has been successfully completed, forward transmitter 126 may enter an operational phase during which a normal operating power level 746 is utilized to transmit forward data over forward link 130 (FIG. 1).

In the FIG. 7 example, during the transmit power adjustment procedure, forward transmitter 126 initially sets the transmit power level to a pre-defined minimum power level 726. Forward transmitter 126 may then periodically increment the transmit power level by any desired amount(s) until the normal operating transmit power level 746 is reached. In certain embodiments, the power increment value for increasing the current transmit power level is a pre-determined increment value. However, in other embodiments, the power increment value may be determined dynamically. In addition, the power increment value may be the same value for each power incrementing step, or may alternately be implemented to include various different increment values.

In the FIG. 7 example, after minimum power level 726 is initially set, the transmit power adjustment procedure may sequentially include transmit power levels 730, 734, 738, and 742, before reaching normal transmit operating power level 746. In certain embodiments, the transmit power levels may be periodically incremented at a pre-determined time interval. However, in other embodiments, the time interval(s) for incrementing transmit power levels may be determined dynamically. In addition, the time interval for incrementing transmit power levels may be the same for each power incrementing operation, or may alternately include various different time intervals. One embodiment for performing a transmit power adjustment procedure is discussed below in conjunction with FIG. 9.

Figure 8:
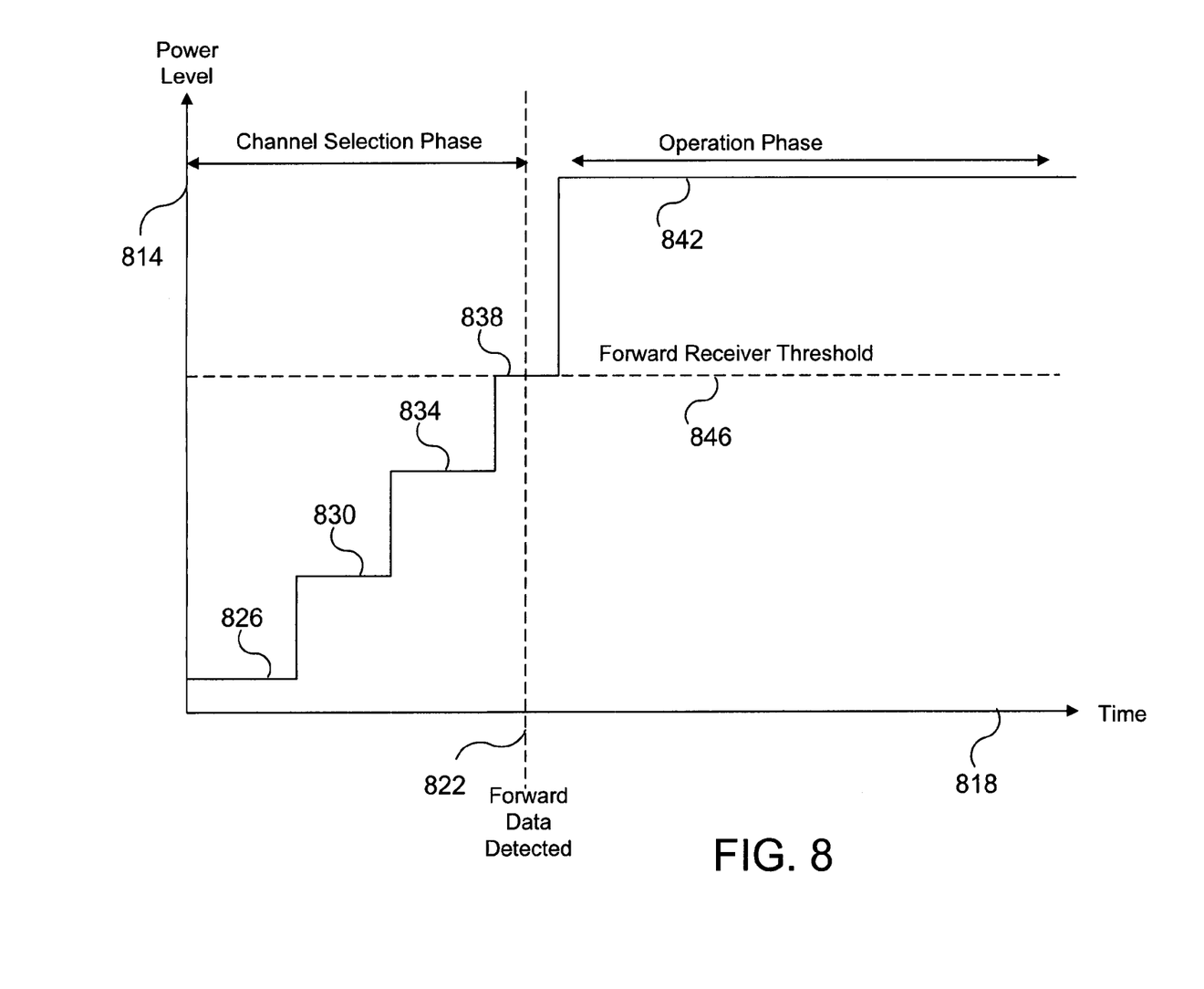
FIG. 8 is a graph illustrating an exemplary transmit power adjustment procedure, in accordance with one embodiment of the present invention.

Referring now to FIG. 8, a graph illustrating an exemplary transmit power adjustment procedure is shown, in accordance with the present invention. The FIG. 8 embodiment is presented for purposes of illustration only, and in alternate embodiments, various transmit power adjustment procedures may be performed using relationships and techniques in addition to, or instead of, certain of those relationships and techniques discussed in conjunction with the FIG. 8 embodiment.

In the FIG. 8 example, transmit power levels of forward transmitter 126 (FIG. 1) for transmitting forward data over a forward link 130 are shown on a vertical axis 814. In addition, time is shown progressing from left to right on a horizontal axis 818. In the FIG. 8 example, a channel selection phase occurs prior to time axis 822 during which the transmit power adjustment procedure is concurrently performed. In the FIG. 8 example, after time axis 822, when the channel selection procedure has been successfully completed, forward transmitter 126 may enter an operational phase during which a normal operating power level 842 is utilized to transmit forward data over forward link 130 (FIG. 1).

In the FIG. 8 example, during the transmit power adjustment procedure, forward transmitter 126 initially sets the transmit power level to a minimum power level 826. Forward transmitter 126 may then periodically increment the transmit power level by any desired amount(s) until a forward receiver 138 (FIG. 1) first detects the forward data at time 822, and an embedded identifier is returned to a reverse receiver 158 over a reverse link 154, as discussed above in conjunction with FIG. 1. In certain embodiments, the power increment value is a pre-determined increment value, however, in other embodiments, the power increment value may be determined dynamically. In addition, the power increment value may be the same value for each power incrementing step, or may alternately be implemented to include various different increment values.

In the FIG. 8 example, after minimum power level 826 is initially set, the transmit power adjustment procedure may sequentially utilize transmit power levels 830, 834, and 838, before reaching the forward receiver threshold 846 of forward receiver 138 (FIG. 1). In certain embodiments, the transmit power levels may be incremented at a pre-determined time interval. However, in other embodiments, the time interval for incrementing transmit power levels may be determined dynamically. In addition, the time interval for incrementing transmit power levels may be the same for each power incrementing step, or may alternately include various different time intervals.

In the FIG. 8 example, when forward receiver 138 detects forward data on forward link 130 at time axis 822, and the embedded identifier is returned, then the reverse channel selection procedure may be successfully completed. Forward transmitter 126 may then enter the operational phase during which the forward transmit power level is set to normal operating power level 842. One embodiment for performing a transmit power adjustment procedure is discussed below in conjunction with FIG. 9.

Figure 9:
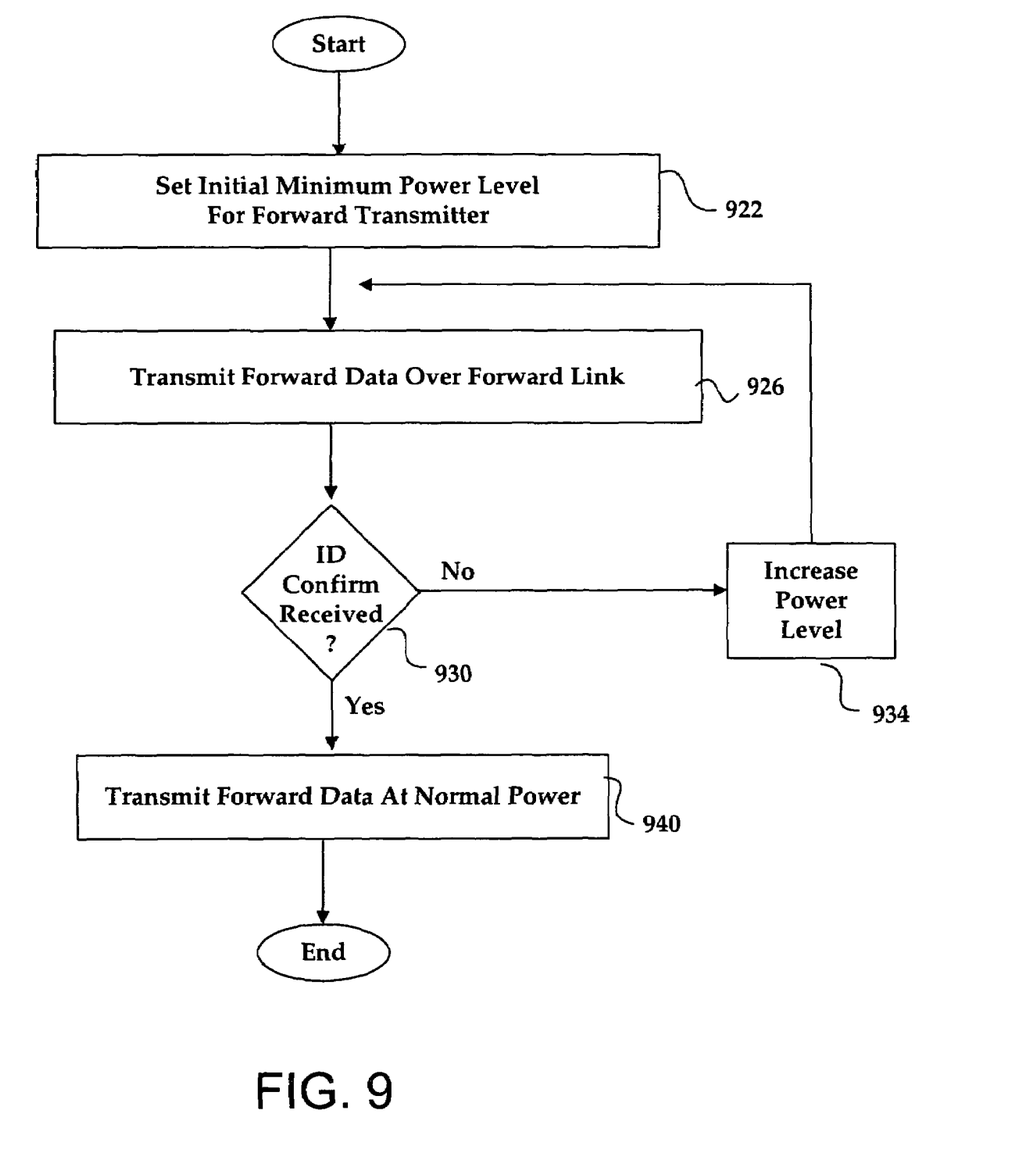
FIG. 9 is a flowchart of method steps for performing a transmit power adjustment procedure, in accordance with one embodiment of the present invention.

Referring now to FIG. 9, a flowchart of method steps for performing a transmit power adjustment procedure is shown, in accordance with one embodiment of the present invention. The FIG. 9 example is presented for purposes of illustration, and in alternate embodiments, the present invention may readily utilize steps and sequences other than certain of those discussed in conjunction with the FIG. 9 embodiment.

In the FIG. 9 embodiment, in step 922, a controller A 222 of a forward transmitter 126 from a source communications manager 122 initially sets a minimum power level for a forward modulator 218 of the forward transmitter 126. Then, in step 926, the forward modulator 218 of forward transmitter 126 transmits forward data at the reduced power level over a forward link 130 to a forward receiver 138 of a destination communications manager 134.

In step 930, the controller A 222 determines whether an ID confirmation signal has been received from a controller D 530 in a reverse receiver 158 of the source communications manager 122. The foregoing ID confirmation signal indicates that the forward receiver 138 has successfully received the transmitted forward data at a reduced transmit power level, and a reverse transmitter from the destination communications manager 134 has responsively returned an embedded identifier from the forward data to the reverse receiver 158 over a selected reverse channel.

In step 930, if no ID confirmation signal has been received by controller A 222, then in step 934, controller A 222 instructs the forward modulator 218 to increase the transmit power level by a selectable amount. The FIG. 9 process may then return to steps 926, 930, and 934, and repeatedly increment the transmit power level for forward link 130 until an ID confirm signal is received from controller D 530 of reverse receiver 158. Finally, in step 940, after an ID confirm signal has been received from controller D 530 of reverse receiver 158, controller A 222 of forward transmitter 126 may instruct forward modulator 218 to commence a normal operational mode, and transmit the forward data over forward link 130 at a normal operating transmit power level. The FIG. 9 process may then terminate. For at least the foregoing reasons, the present invention therefore provides an improved system and method for effectively performing a transmit power adjustment procedure in a wireless network.

Figure 10:
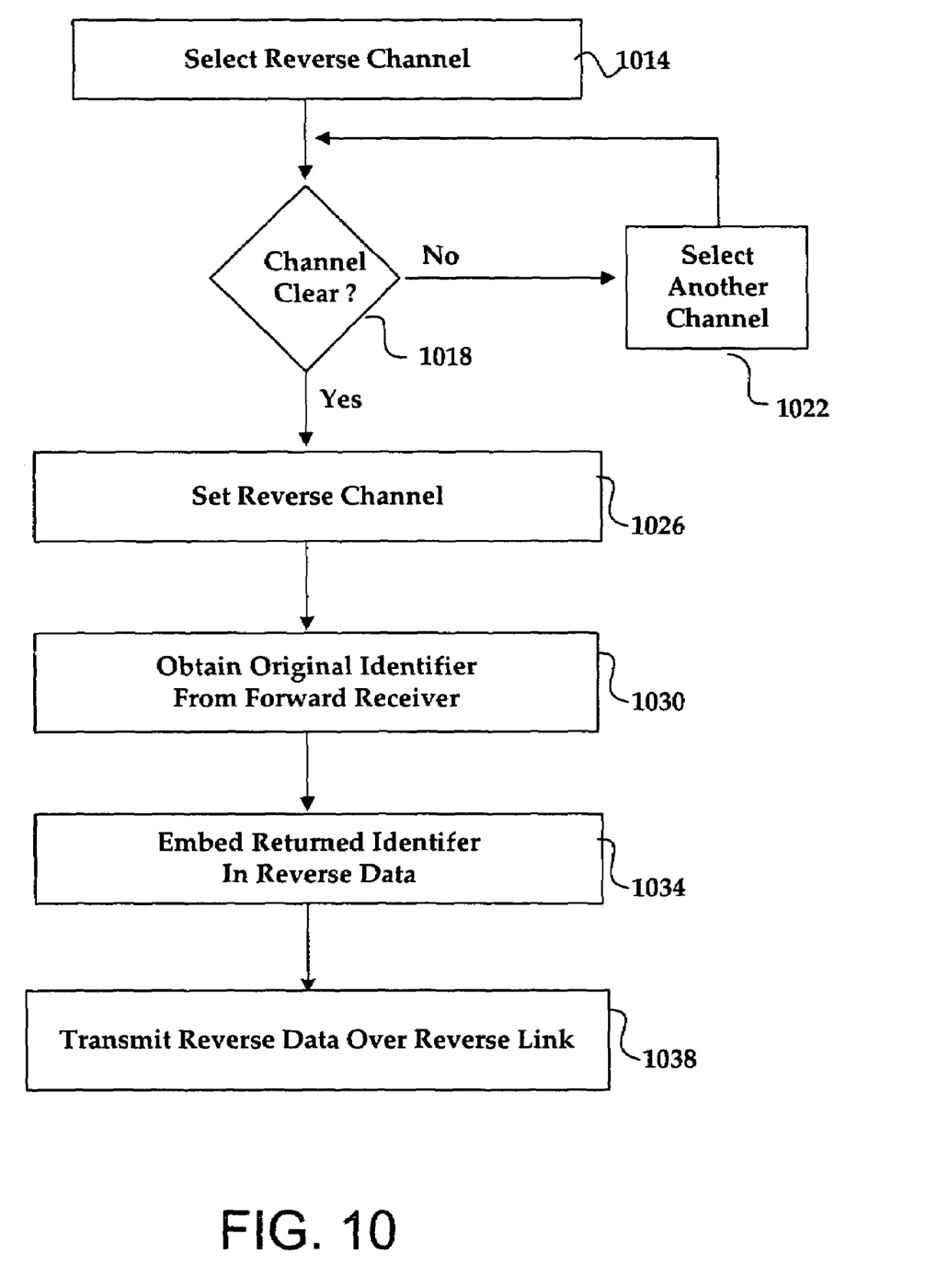
FIG. 10 is a flowchart of method steps for utilizing the reverse transmitter of FIG. 1, in accordance with one embodiment of the present invention.

Referring now to FIG. 10, a flowchart of method steps for utilizing the FIG. 1 reverse transmitter 150 in a channel selection procedure is shown, in accordance with one embodiment of the present invention. The FIG. 10 example is presented for purposes of illustration, and in alternate embodiments, the present invention may readily utilize steps and sequences other than certain of those steps and sequences discussed in conjunction with the FIG. 10 embodiment.

In the FIG. 10 embodiment, in step 1014, reverse transmitter 150 initially selects a reverse channel for transmitting reverse data over a reverse link 154 (FIG. 1). In step 1018, reverse transmitter 150 evaluates the selected reverse channel to determine whether that reverse channel is clear of wireless transmissions from other wireless electronic systems. If the currently selected reverse channel is not clear, then in step 1022, reverse transmitter 150 selects and evaluates another reverse channel of reverse link 154.

However, in step 1018, if reverse transmitter 150 determines that the currently selected reverse channel is clear, then in step 1026, reverse transmitter 150 sets that reverse channel for transmitting reverse data over reverse link 154. In step 1030, reverse transmitter 150 obtains an original identifier from a forward receiver 138, as discussed above in conjunction with FIG. 6. In step 1034, reverse transmitter 150 embeds the received original identifier in an unchanged state into the reverse data as a returned identifier. Then, in step 1038, reverse transmitter 150 transmits the reverse data with the embedded returned identifier to a reverse receiver 158 via reverse link 154 (FIG. 1). The FIG. 10 process may then terminate.

Figure 11:
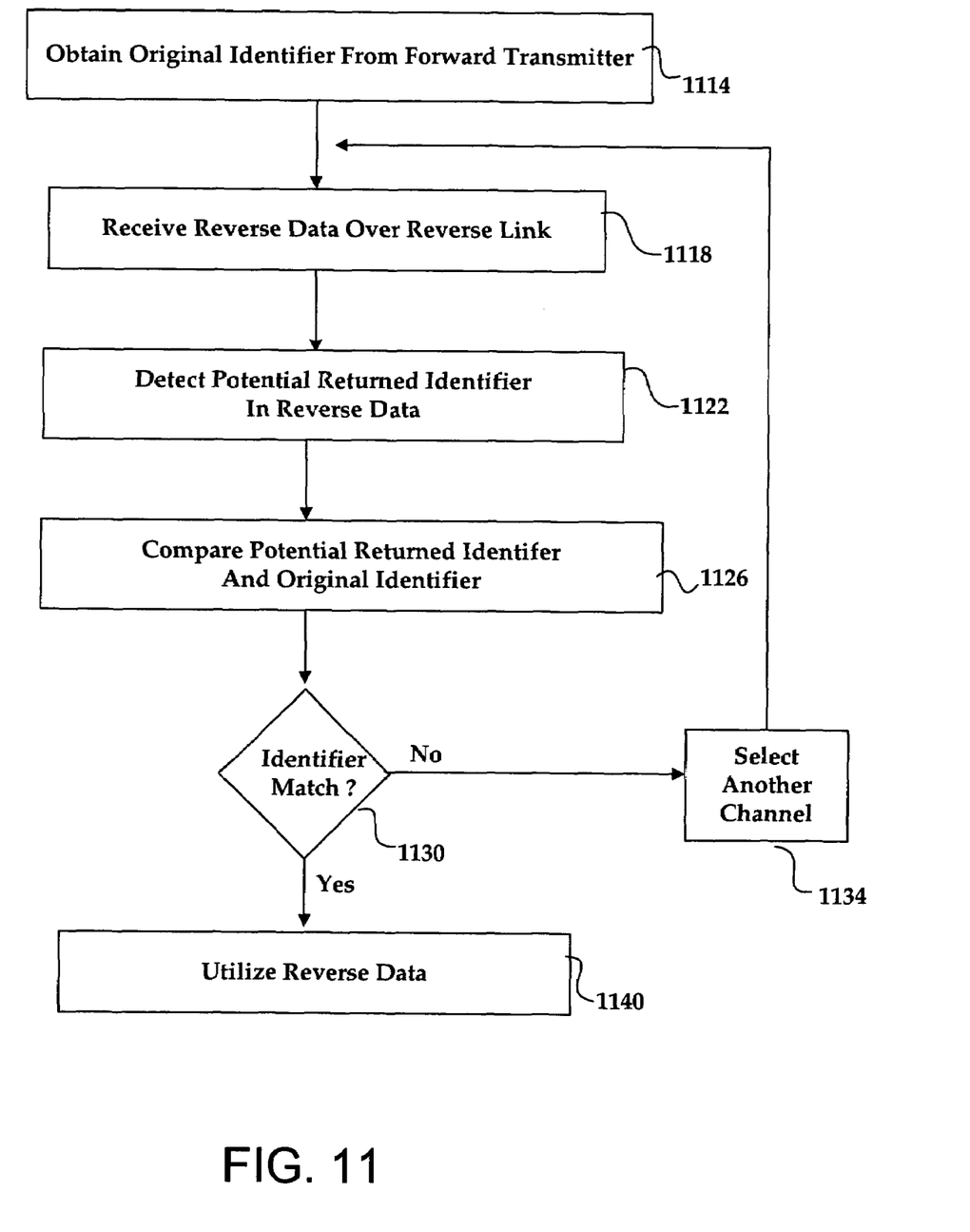
FIG. 11 is a flowchart of method steps for utilizing the reverse receiver of FIG. 1, in accordance with one embodiment of the present invention.

Referring now to FIG. 11, a flowchart of method steps for utilizing the FIG. 1 reverse receiver 158 is shown, in accordance with one embodiment of the present invention. The FIG. 11 example is presented for purposes of illustration, and in alternate embodiments, the present invention may readily utilize steps and sequences other than certain of those steps and sequences discussed in conjunction with the FIG. 11 embodiment.

In the FIG. 11 embodiment, in step 1114, a reverse receiver 158 (FIG. 1) initially obtains an original identifier from a forward transmitter 126, as discussed above in conjunction with FIG. 6. In step 1118, the reverse receiver 158 receives reverse data from a reverse transmitter 150 (FIG. 1) over a selected reverse channel of a reverse link 154, as discussed above in conjunction with FIG. 10. In step 1122, reverse receiver 158 detects a potential returned identifier in the reverse data transmitted over reverse link 154.

In step 1126, reverse transmitter 158 performs a matching procedure to compare the potential returned identifier and the foregoing original identifier. In step 1130, reverse receiver 158 determines whether an identifier match exists between the potential returned identifier and the original identifier to indicate that reverse receiver 158 is coupled through the selected reverse channel to the correct reverse transmitter 150.

If reverse receiver 158 determines that there is no identifier match, then in step 1134, reverse receiver 158 selects another reverse channel and returns to step 1118 to examine additional potential returned identifiers for an identifier match. However, in step 1130, if reverse receiver 158 determines that there is an identifier match, then in step 1140, reverse receiver 158 may provide set the power level of forward transmitter 126 to a normal operating level, and may provide the current reverse data to an appropriate data destination for utilization. The FIG. 11 process may then terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a transmit power adjustment procedure in a wireless network, comprising:
   a forward receiver wirelessly coupled to a forward link, said forward receiver searching for forward data that is transmitted over said forward link;
   a forward transmitter configured to transmit said forward data over said forward link, said forward transmitter initially transmitting said forward data at a minimum power level, said forward transmitter gradually increasing said minimum power level to a forward receiver power level threshold that is less than a normal operating power level of said forward transmitter, said forward receiver first detecting said forward data on said forward link at said forward receiver power level threshold.

2. The system of claim 1 further comprising a video programming source and a video programming display, said video programming source initially providing said forward data as video program data to a source communications manager that includes said forward transmitter, said video programming display receiving said forward data from a destination communications manager that includes said forward receiver.

3. The system of claim 1 wherein said forward receiver confirms to said forward transmitter that said forward data has been detected at said forward receiver power level threshold, said forward receiver then transmitting said forward data at said normal operating power level during a normal operation phase.

4. The system of claim 1 wherein said transmit power adjustment procedure ensures that said forward receiver receives said forward data only from said forward transmitter, said transmit power adjustment procedure preventing other proximate wireless devices from inadvertently intercepting said forward data transmitted from said forward receiver.

5. The system of claim 1 wherein a controller A of said forward transmitter utilizes a power level control signal to set transmit power levels of a forward modulator of said forward transmitter during said transmit power adjustment procedure, said transmit power levels including said minimum power level and said forward receiver power level threshold.

6. The system of claim 1 wherein a controller A of said forward transmitter monitors a wireless reverse link from said forward receiver for a confirmation signal that indicates that said forward receiver has detected said forward data at said forward receiver power level threshold.

7. The system of claim 6 wherein said controller A periodically increments said minimum power level at a pre-determined time interval by a pre-determined power increase until said forward transmitter receives said confirmation signal when said forward receiver power level threshold is reached.

8. The system of claim 6 wherein said confirmation signal is provided by a reverse receiver coupled to said wireless reverse link, said forward receiver communicating with said reverse receiver through a reverse transmitter over said wireless reverse link.

9. The system of claim 8 wherein a controller D of said reverse receiver generates said confirmation signal to said forward transmitter.

10. The system of claim 1 wherein a controller A of said forward transmitter instructs a forward modulator of said forward transmitter to transmit said forward data at said normal operating power level after said forward receiver confirms that said forward data has been detected at said forward receiver power level threshold.

11. A method for performing a transmit power adjustment procedure in a wireless network, comprising the steps of:
utilizing a forward receiver to search for forward data that is transmitted over a forward link;
transmitting said forward data over said forward link with a forward transmitter that initially transmits said forward data at a minimum power level, said forward transmitter gradually increasing said minimum power level to a forward receiver power level threshold that is less than a normal operating power level of said forward transmitter, said forward receiver first detecting said forward data on said forward link at said forward receiver power level threshold.

12. The method of claim 11 further comprising a video programming source and a video programming display, said video programming source initially providing said forward data as video program data to a source communications manager that includes said forward transmitter, said video programming display receiving said forward data from a destination communications manager that includes said forward receiver.

13. The method of claim 11 wherein said forward receiver confirms to said forward transmitter that said forward data has been detected at said forward receiver power level threshold, said forward receiver then transmitting said forward data at said normal operating power level during a normal operation phase.

14. The method of claim 11 wherein said transmit power adjustment procedure ensures that said forward receiver receives said forward data only from said forward transmitter, said transmit power adjustment procedure preventing other proximate wireless devices from inadvertently intercepting said forward data transmitted from said forward receiver.

15. The method of claim 11 wherein a controller A of said forward transmitter utilizes a power level control signal to set transmit power levels of a forward modulator of said forward transmitter during said transmit power adjustment procedure, said transmit power levels including said minimum power level and said forward receiver power level threshold.

16. The method of claim 11 wherein a controller A of said forward transmitter monitors a wireless reverse link from said forward receiver for a confirmation signal that indicates that said forward receiver has detected said forward data at said forward receiver power level threshold.

17. The method of claim 16 wherein said controller A periodically increments said minimum power level at a pre-determined time interval by a pre-determined power increase until said forward transmitter receives said confirmation signal when said forward receiver power level threshold is reached.

18. The method of claim 16 wherein said confirmation signal is provided by a reverse receiver coupled to said wireless reverse link, said forward receiver communicating with said reverse receiver through a reverse transmitter over said wireless reverse link.

19. The method of claim 18 wherein a controller D of said reverse receiver generates said confirmation signal to said forward transmitter.

20. The method of claim 11 wherein a controller A of said forward transmitter instructs a forward modulator of said forward transmitter to transmit said forward data at said normal operating power level after said forward receiver confirms that said forward data has been detected at said forward receiver power level threshold.

21. A system for performing a transmit power adjustment procedure in a wireless network, comprising:
means for searching by a forward receiver for forward data that is wirelessly transmitted over a forward link;
means for transmitting by a forward transmitter said forward data over said forward link, said means for transmitting initially transmitting said forward data at a minimum power level, said means for transmitting gradually increasing said minimum power level to the forward receiver power level threshold that is less than a normal operating power level of said forward transmitter, said means for searching first detecting said forward data on said forward link at said forward receiver power level threshold.

* * * * *